Feb. 4, 1941.  R. E. PAGE  2,230,695
RECORD CONTROLLED MACHINE
Filed Sept. 22, 1937  4 Sheets-Sheet 1

INVENTOR
Ralph E. Page
BY
W. M. Wilson
ATTORNEY

Feb. 4, 1941.   R. E. PAGE   2,230,695
RECORD CONTROLLED MACHINE
Filed Sept. 22, 1937   4 Sheets-Sheet 2

INVENTOR
Ralph E. Page
BY
ATTORNEY

Feb. 4, 1941.  R. E. PAGE  2,230,695
RECORD CONTROLLED MACHINE
Filed Sept. 22, 1937  4 Sheets-Sheet 3

INVENTOR
Ralph E. Page
BY
ATTORNEY

Feb. 4, 1941.  R. E. PAGE  2,230,695
RECORD CONTROLLED MACHINE
Filed Sept. 22, 1937  4 Sheets-Sheet 4

INVENTOR
Ralph E. Page
BY
ATTORNEY

Patented Feb. 4, 1941

2,230,695

UNITED STATES PATENT OFFICE 2,230,695

RECORD CONTROLLED MACHINE

Ralph E. Page, West Orange, N. J., assignor to International Business Machines Corporation, New York, N. Y., a corporation of New York Application September 22, 1937, Serial No. 165,051

21 Claims. (Cl. 209—110)

This invention relates to record-controlled machines and has for its broad object to improve record controlled machines such as those used to sort perforated accounting and statistical record cards such as are used in the well known Hollerith system.

An object is to provide an improved multi-column selector capable of selecting records in accordance with alphabetic as well as numerical data.

Another object is to provide means which very considerably reduces the amount of time necessary to arrange records in consecutive order.

An object is to provide means for controlling a sorting machine which makes it unnecessary to wait until all the records of a batch are in consecutive order before the records can be used in other record-controlled machines such as tabulators.

As heretofore practiced, the method of placing a batch of records in numerical order requires that the records be kept together and resorted repeatedly until the entire batch of records is placed in the desired order. It has been discovered that by the addition of certain mechanism to the sorting machine, it is possible to materially shorten the time necessary to place the cards in consecutive order and to make certain of them available for use before all the cards have been arranged in consecutive order.

The present invention contemplates the provision of means whereby, during each run of the machine with respect to a given column, those records which bear low numbers and do not require further treatment in the sorting machine are eliminated and may be used in other machines immediately, thereby shortening the time necessary to sort the records into numerical order and enabling reports to be obtained much more quickly than is usually the case.

Further objects of the instant invention reside in any novel feature of construction or operation or novel combination of parts present in the embodiment of the invention described and shown in the accompanying drawings whether within or without the scope of the appended claims and irrespective of other specific statements as to the scope of the invention contained herein.

Figures 1, 3:
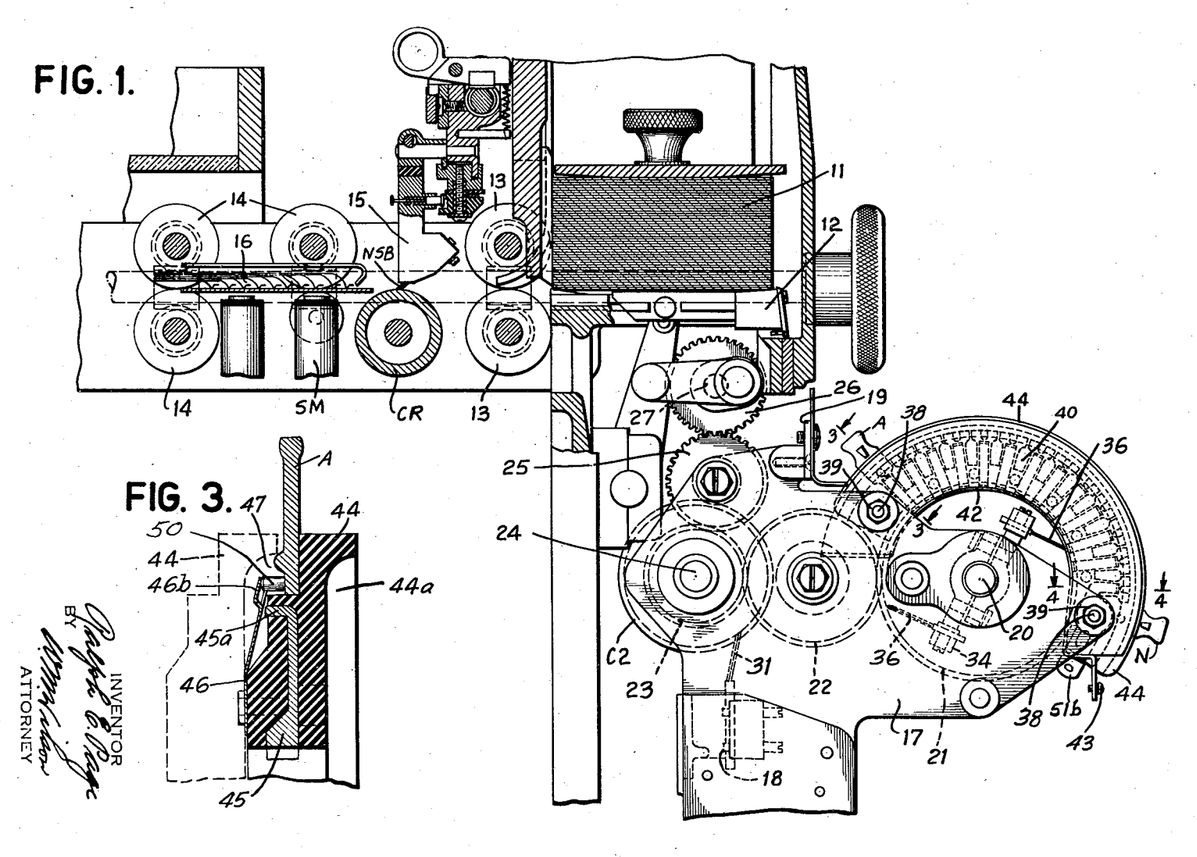
Fig. 1 is a vertical section of a portion of a sorting machine showing the present invention attached thereto.
Fig. 3 is a section on the line 3—3 of Fig. 1.

In the drawings:

Fig. 1 shows a partial vertical section of the well known "International" electric sorting machine the basic construction and operation of which are substantially the same as the one described in Patent No. 1,741,985. Since the general construction and operation of this machine is now well known in the art only a brief general description will be given herein.

The reference numeral 11 (Fig. 1) generally designates the card hopper in which the cards to be sorted are usually placed face down and with "9" positions at the left. Cards are removed from the hopper 11 one at a time by picker mechanism generally designated 12 which advances the card at the bottom of the hopper to the left far enough to be gripped by feed rollers 13 which convey the card to the left over the usual contact roller CR. Further feed rollers 14 continue the feeding of the card to the left into the proper pocket. As the card passes over the contact roller CR the holes in the card are sensed by the usual normal sorting brush NSB which is mounted in a removable brush holder 15 of the form described in Patent No. 1,741,992. As described in the latter patent, the brush holder may be adjusted lengthwise of the contact roller CR to bring the normal sorting brush into cooperation with any desired column in the card. While the card is passing the brush NSB the left hand or leading edge thereof passes underneath the ends of the usual sorting blades 16 which lead to the respective pockets (not shown). The location of the brush NSB with respect to the ends of the blades 16 is such that when the brush extends through a hole of predetermined value in the column sensed by said brush, the leading edge of such card will be just under the end of the blade 16 leading to the pocket corresponding to the value of the hole in the card. In other words, if the brush NSB sensed a "7" hole, for example, the leading edge of the card would be just under the "7" blade. The blades 16 are controlled by the sorting magnet SM.

Assuming that the normal sorting brush senses such a hole, a circuit will be established through the sorting magnet SM as follows (Fig. 9): The left hand line wire W1, switch S2 closed for this operation, the usual common brush CB bearing on the contact roller CR, the contact roller, brush NSB, the usual single column selecting commutator C1, brush relay R3, and sorting magnet SM, to the right hand line wire W2. The energization of sorting magnet SM (Fig. 1) occurs at the instant when the leading edge of the card is just under the "7" blade 16 and is operative to drop all of the sorting blades 16 with the exception of the "7" and "8" blades, whereby the card having the "7" hole will pass between the "6" and "7" blades 16 and eventually will become deposited in the "7" pocket. If it should happen that there is no hole in any of the index-point positions of the column sensed by the brush NSB, the card will pass underneath all of the blades 16 and become deposited in the usual reject pocket.

In order to carry out the objects of the invention, there is provided a novel selecting commutator which may be used both for the operation of multi-column selection and the numerical order sorting operation. The structure of this commutator is illustrated in Figs. 1 to 8. The commutator is mounted in a pair of frame plates 17 (Figs. 1 and 2) secured in suitable fashion to the main frame of the sorting machine. These frame plates 17 are rigidly joined together their lower left hand edges (Fig. 1) by a frame casting 18 and at their upper left hand edges by a cross bar 19. Rotatably mounted in suitable bearings in the frame plates 17 is a shaft 20 (Figs. 1 and 2) to which is secured a gear 21. The gear 21 meshes with an idler gear 22 (Fig. 1) which, in turn, meshes with a pinion 23 fixed on a shaft 24 journaled in the frame plate 17. The pinion 23 meshes with an idler gear 25 meshing with a gear 26 fixed to the shaft 27 which, through a suitable crank, operates the picker mechanism 12 in a well known way. Secured to shaft 27 is a worm gear 28 meshing with a worm 29 secured to the main shaft 30 which drives the feed rollers 13 and 14 through suitable gearing not shown. Through the gearing just described, the shaft 20 rotates at the rate of one-half revolution per card cycle of the machine and shaft 24 makes one revolution in the same period.

Figure 8:
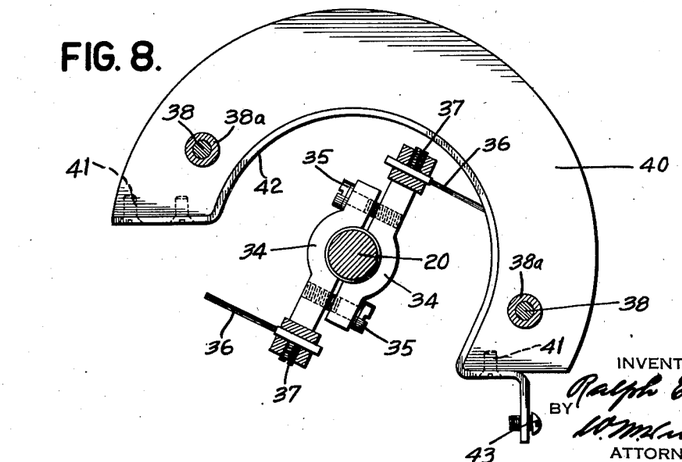
Fig. 8 is a section on the line 8—8 in Fig. 2.

Mounted upon the shaft 24 are the commutators designated C2, C3, and C4 with which cooperate the pairs of brushes 31, 32, and 33, respectively. Mounted upon the shaft 20, as best shown in Fig. 8, is a brush assembly which comprises two castings 34 joined together and clamped on the shaft 20 by means of screws 35. Each of the castings 34 has a row of holes in which the shanks of brushes 36 are held in place by means of set-screws 37. For purposes of illustration, the selecting commutator has been shown as having a capacity of ten columns. Accordingly, there are eleven brushes 36 mounted in each casting 34 in such fashion that the brushes are in alignment both longitudinally and diametrically of the shaft 20. The purpose of the eleventh brush in each row will be made clear hereinafter.

Two rods 38 are mounted in aligned holes in the frame plates 17, nuts 39 on threaded ends of the rods serving as a means to both adjust the rods longitudinally and clamp them securely to the frame plate 17. These rods 38 support tubes 38a of insulating material on which is mounted a series of eleven commutator assemblies. One of these assemblies shown in Fig. 8, in cooperation with one of the brushes 36, serves as a means of connecting the circuits of the machine to the rotary brushes 36. The commutator assembly shown in Fig. 8 consists of an arcuate strip 40 of insulating material such as Bakelite having its inner edge conforming to an arc of a circle having its center co-incidental with the longitudinal axis of shaft 20. Secured to this concentric portion at the ends of the strip 40, as by means of screws 41, is a curved metallic contact strip 42 over which the foremost brush 36 (Fig. 8) in each row wipes. A terminal screw 43, screwed into a threaded hole in a downwardly bent portion of the strip 42, serves as a means for connecting a wire to the contact strip 42. It is evident from the dimensions and shape of the contact strip 42 that one or the other of the brushes cooperating with this strip will always be wiping over said contact strip as the shaft 20 rotates.

The construction of the remaining commutator assemblies is best illustrated in Figs. 3 to 7. Each assembly consists of an arcuate member 44 which is molded from plastic insulating material such as "Bakelite" and has the shape in transverse section illustrated in Figs 3 and 4. Each of the members 44 has a hole at each end thereof through which passes one of the tubes 38a whereby the members 44 are supported and clamped in nested relation on the frame plate 17 by means of the rods 38. Molded into each of the members 44, as best shown in Fig. 3, is a series of twelve commutator segments 45 which radiate from the center of shaft 20. The inner ends of the segments 45 are flush with the inner cylindrical surfaces of the members 44 and the spacing of the brushes 36 is such that each row of segments 45 is wiped by one of the brushes 36, one row of brushes being active at a time.

Figure 2:
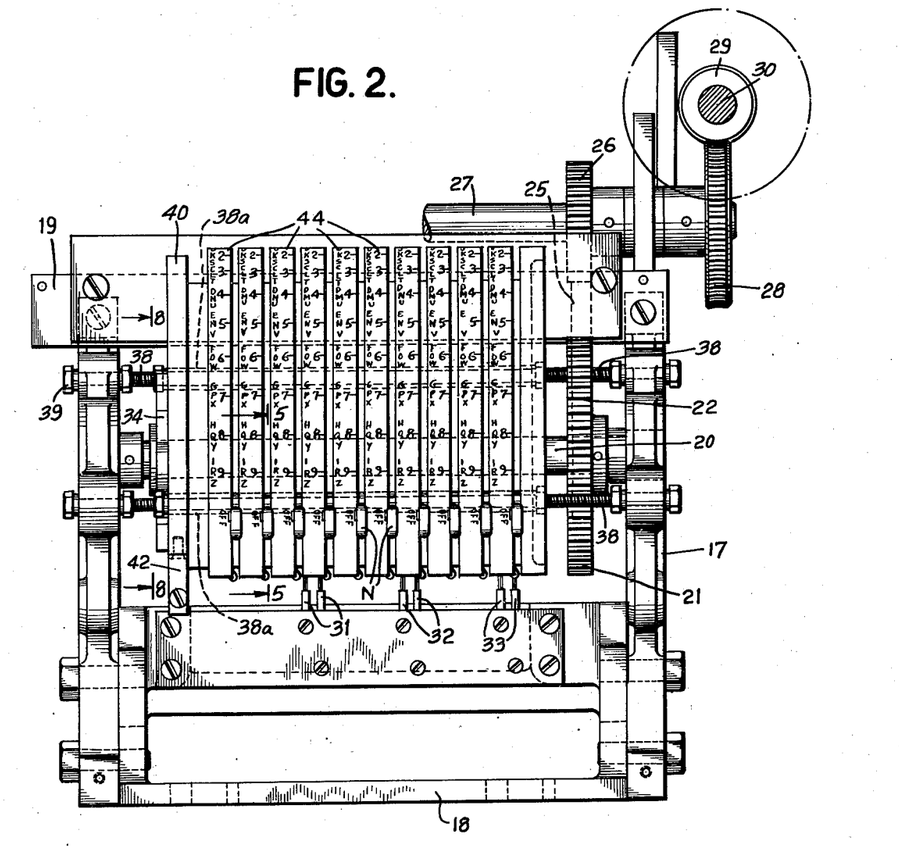
Fig. 2 is an elevation of the commutator appearing in Fig. 1.
Figure 4:
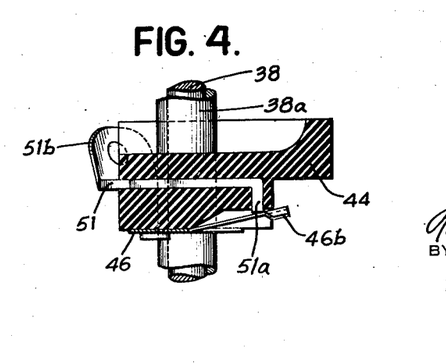
Fig. 4 is a section on the line 4—4 in Fig. 1.
Figures 5, 6, 7:
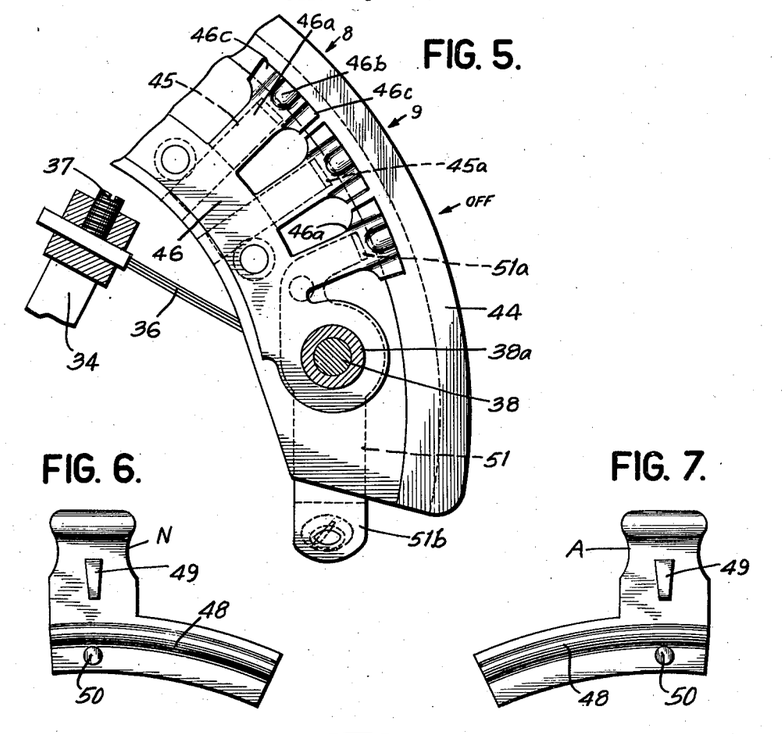
Fig. 5 is an enlarged section on the line 5—5 in Fig. 2.
Figs. 6 and 7 are large scale side elevations of the finger pieces shown in Figs. 1 and 2.

The outer ends 45a (Figs. 3 and 5) of the segments 45 are bent at right angles to the body portions so as to extend longitudinally of the shaft 20 and are arranged to project slightly beyond the sides of the members 44. Secured to the left hand side (Fig. 3) of each member 44 is an arcuate contact strip 46 which, as best shown in Fig. 5, is formed with a plurality of prongs or contact fingers 46a engaging the lugs 45a. Members 44 have recesses 44a whereby adjacent members 44, when properly assembled in nested relation, form channels 47 (Fig. 3) in which are slidably mounted pairs of slides designated N and A. The extreme left hand member 44 in Fig. 2 is a dummy the sole function of which is to cooperate with the adjacent member 44 to guide the finger pieces A and N of the latter member.

These slides are best shown in Figs. 6 and 7 and are substantially alike in their general construction except that the relative position of portions thereof is reversed. Each slide is formed with an arcuate rib 48 which in cooperation with the recessed portion 44a (Fig. 3) of each member 44 serves to slidably retain the slides in position between the members 44. Preferably, the slides N and A are molded from plastic insulating material such as "Bakelite" and have portions 49 (Figs. 6 and 7) serving as an index mark to facilitate the manual positioning of these slides according to scales of numbers graduated on the outer cylindrical surfaces of the members 44 (Fig. 2).

The index portion 49 may take the form of a molded projection or of a molded depression filled with paint of contrasting color. The object of having the externally projecting portions of the slide at the ends of the arcuate portions 48 rather than at the middle of said portions is to enable the two slides for each commutator assembly to be brought opposite any two adjacent numbers on the scale. In other words, to permit the slides A and N of a given assembly to be set at let us say "0" and "1."

Directly below the index mark 49 each slide is provided with a metallic button or stud 50 (Figs. 3, 6, and 7) which is of sufficient length to engage the fingers 46a of contact strips 46 and cam them out of contact with the lugs 45a as shown in Fig. 3. There is a segment 45 and a finger 46a to correspond with each index-point position of a card column whereby, since the selecting commutator as a whole has a capacity of ten columns, there is a segment 45 and a finger 46a for each index-point position of a field comprising ten columns on the record card. The segments 45 are spaced circumferentially of the members 44 whereby the brushes 36 wipe over said inserts in synchronism with the passage of the card brushes over the index point positions of the card columns. Thus, if the card brush senses a hole in say the "7" position, one row of brushes 36 will be resting on all of the inserts 45 corresponding to the numerals "7" of the scales engraved on the members 44.

In order to facilitate the positioning of the slides A and N and to yieldingly hold them in their proper positions with the index portions 49 in alignment with the proper graduations on the scales, the fingers 46a are shaped to provide cam surfaces 46b (Fig. 5) separated by shallow notches 46c which cooperate with the rounded ends of the studs 50 to yieldingly hold the slides in their set positions and prevent them from being jarred out of their proper positions by vibration of the machine.

The slides N, in cooperation with one of the fingers 46a and inserts 51 (Figs. 4 and 5) also act as switches for making and breaking the connections between the contact strips 46 and the wiring of the machine. There is an insert 51 molded into each of the members 44 and each has a bent-over lug 51a similar to the lugs 45a and likewise cooperating with a finger 46a of the contact strip 46. When one of the slides N is moved downwardly or clockwise (Figs. 1 and 5) to the "off" position in Fig. 2, projection 50 (Fig. 6) engages the lowermost prong 46a of the associated contact strip 46 and moves it away from the lug 51a. This prevents circuits from being established through the contact strip 46 and segments 45. Each member 51 is provided with a bent over lug 51b (Figs. 4 and 5) having a terminal screw by means of which the insert 51 may be connected to the wiring of the machine. When slides N are moved below the "off" position, as in Fig. 1, they become ineffective to control the contact prongs 46a but slides A can still control any of the prongs.

Figure 9:
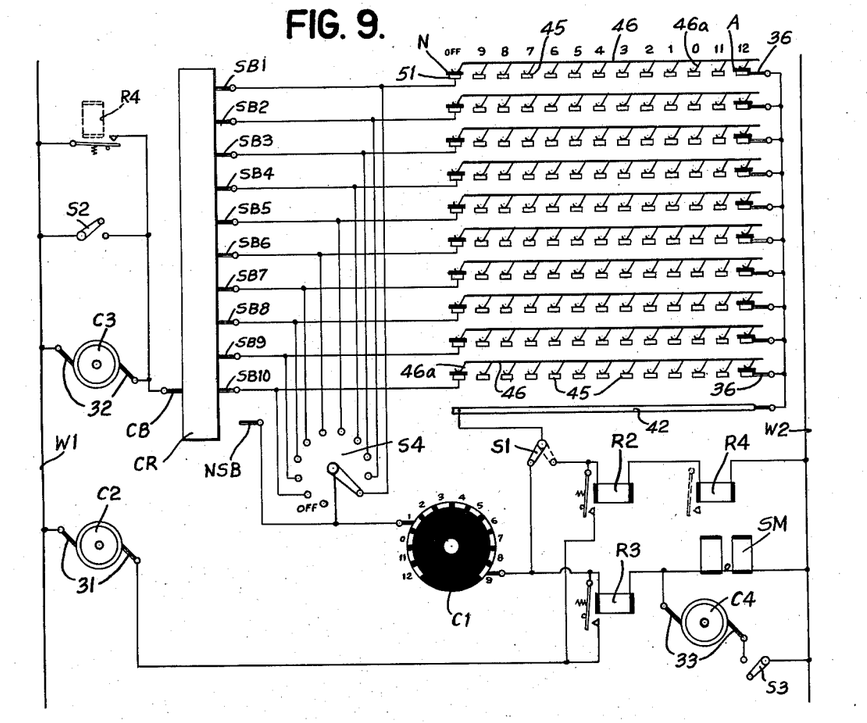
Fig. 9 is a wiring diagram.

In Fig. 9 the letters N and A designate diagrammatic representations of the slides by means of small black rectangles. These rectangles diagrammatically indicate separation of the fingers 46a of contact strips 46 from the adjacent segments 45 and inserts.

The operation of the selecting commutator described in the foregoing paragraphs will now be explained with reference to specific examples.

It will be assumed that the record cards have a control number field comprising ten columns in which are recorded by means of perforations control numbers ranging from only one digit up to a plurality of digits and it is desired to arrange a batch of the cards in consecutive order by control numbers.

The normal sorting brush holder 15 having a single brush is removed and a multiple brush holder comprising ten brushes designated SB1 to SB10 in Fig. 9 is substituted therefor. A form of multiple brush holder which it is convenient to use is illustrated in Patent No. 1,933,357. Each brush SB1, SB2, SB3, etc., is connected by means of one of the wires of a cable to one of the lugs 51b (Fig. 5) of inserts 51 and also to one of the controls of a dial switch S4. It will be assumed that the brush SB1 is positioned to sense the units column of the control number field, brush SB2 to sense the tens column, and so on for the remaining brushes. The dial switch S4 is set initially to the position of Fig. 9 whereby to connect commutator C1 to the brush SB1. Switches S2, S3 are placed in open position, commutator C1 is made current conducting for all index-point positions except "11" and "12" positions in a well known way, and switch S1 is placed in the broken line position.

Ordinarily, sorting to arrange cards in numerical order by means of a machine like the one described in Patent No. 1,741,985 is begun with the units column and ends with the column in which the highest denominational order is recorded. Obviously, during each denominational run of the machine, there will be some cards present in the batch which will have zeros recorded in the column sensed by the card brush and in the columns for the higher orders. As these cards have lower control numbers than those having holes designating numerals other than zero and have been already arranged in numerical order by previous runs, it is advantageous to remove these cards immediately as it would be a waste of time to continue running them through the machine. This result is obtained by setting the multi-column selector so that the commutator is non-current conducting in the zero positions for all of the columns of higher denominational order. Accordingly, all except the extreme right hand slide A in Fig. 2, which corresponds to the units column, are set to the "0" position, while all of slides N are placed in the position of Fig. 1. The extreme right hand or units slide A (Fig. 2) is placed in the "off" position. The cards are placed in the hopper 11 (Fig. 1) face down, with the "9" positions at the left, and the machine is started in the usual way.

It will be assumed that the first card is perforated in the units column to represent the numeral "1" and the other columns are provided with "0" holes. When this card passes the brushes SB1 to SB10, commutator C3 being current conducting from the "9" position to a little beyond the "1" position (Fig. 10), a circuit will be set up as follows when the brush SB1 senses the "1" hole in the units column: Line wire W1, brushes 32 and segment of commutator C3, brush CB, contact roller CR, brush SB1, the dial switch S4, commutator C1, brush relay R3 and sorting magnet SM to line wire W2. The sorting magnet SM is energized in the usual way to cause the card having the "1" hole to become ultimately deposited in the "1" pocket. Since this card has only "0" holes in the remaining columns, no circuits can be established through brushes SB2 to SB10 to the selecting commutator and hence relays R2 and R4 are not affected. In a similar fashion all cards which have a hole designating the numerals "1" to "9" in the units column will cause the sorting magnet SM to be energized and such cards will be conveyed to the proper pockets.

Figure 10:
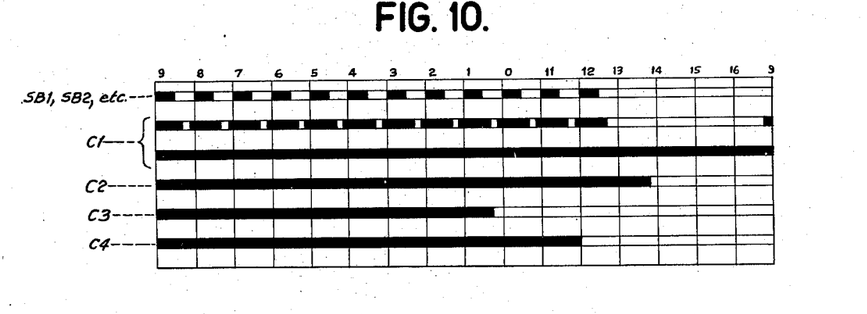
Fig. 10 is an electrical timing chart.

If a card is sensed which has a "0" hole in the units column of a control number field, it signifies that this card has a control number recorded therein of the value 10 or greater and requires further sorting operations. When the "0" hole in the units column is sensed, it is desired that this card be distributed to the "0" pocket because it must again pass through the machine to place it in its proper sequence with respect to a higher denominational order. This card will have a hole other than "0" in some other column of higher denominational value. It will be assumed for purposes of illustration that this card has the control number 10. When the "1" point in the cycle is reached, a circuit will be established through the brush SB2 as follows: Line wire W1, the brushes 32 and segment of commutator C3, brush CB, contact roller CR, brush SB2, the insert 51 and lug 51a (see Figs. 4 and 5) associated with the second slide N from the right in Fig. 2, the prong 46a associated with the lug 51a, contact strip 46, the prong 46a associated with the "1" segment 45, said segment, one of the brushes 36, common strip 42, switch S1, and relays R2 and R4, to line wire W2. Relay R2 closes its contacts to establish a holding circuit for itself and relay R4 which extends from line wire W1 through the brushes 31 and segment of the commutator C2, contacts of relay R2, and the coils of relays R2 and R4, to line wire W2. The contacts of relay R4 close and shunt the commutator C3, which it will be noted from Fig. 10 is not effective at the "0" point in the cycle.

The dropping of the brush SB1 into the "0" hole in the units column of the card permits a circuit to be established from line wire W1, the contacts of relay R4, common brush CB, contact roll CR, brush SB1, the dial switch S4, the commutator C1, brush relay R3, and sorting magnet SM, to line wire W2. As a consequence of this circuit, the card having the control number 10 will become deposited in the "0" pocket.

After the first sorting operation with respect to the units column, the cards in the pockets are manually stacked together in the usual way to place them in proper numerical order according to the units denominational order and are replaced in the hopper. The dial switch S4 is now moved along one point to connect the brush SB2 to the commutator C1. The slide N associated with the tens section of the multi-column selecting commutator is moved from the "0" position to the "off" position. During the second run of the machine the cards will be distributed to the pockets according to the values of the holes occurring in the tens column of the control number field.

During the second run of the machine, there may be many cards present which have a hole designating a significant figure only in the units column and these cards, while they may be scattered throughout the batch, will nevertheless be in numerical order taken by themselves and will need no further treatment. Ordinarily, these cards would be again run through the machine as many times as there are denominational orders for which there is a significant figure. In other words, if the numbers run as high as six digits, all cards would have to be run five more times through the machine. When a card having zero holes in all but the units column is sensed by the brushes SB1 to SB10, no circuits can be set up through brushes SB3 to SB10 and the multi-column selecting commutator with the result that relays R2 and R4 will not be energized. Thus, when the brush SB2 encounters the "0" hole which, of course, is present in the tens column of this card, no circuit can be set up through the sorting magnet SM since commutator C3 (Fig. 10) is not effective at the "0" position and the contacts of relay R4 will be open.

When any of the brushes SB3 to SB10 senses a hole representing any of the values 1 to 9 in the hundreds and higher columns, relays R2, R4 will be energized and enable these cards to be distributed to the pockets as described above for the units column. After each run of the machine has been completed with respect to a given column, the dial switch S4 is advanced one point further and the slide N associated with the brush which was previously operative to control the distribution of the cards to the pocket according to the numerical values of the holes will be moved to the off position.

As a result, the cards which have zero holes in all but the units column, and which have been previously arranged in numerical order during the first run, will be conveyed to the reject pocket during the second run while all other cards will be sorted in the usual way under control of all the holes in the tens column. The cards in the reject pocket at the end of the second run of the machine can be used immediately without waiting until the sorting operations have been completed for all columns.

It will be noted that the effect of the multi-column selecting commutator is, during each denominational run of the machine with respect to a given column of a field, to permit those cards having a "0" hole in the given column to become deposited in the "0" pocket only when such cards have holes representing numerals other than "0" in the columns assigned to the higher denominational orders. In other words, if there is a hole representing a numeral other than "0" in the given column or any of those for the higher denominational orders, the cards will be distributed to the pockets in complete accordance with the position of the holes in the given column.

It is thus possible not only to effect a considerable saving in time in respect to sorting operations alone, thereby reducing the number of machines required and the labor necessary for attendance of the machines, which mainly consists of manual juggling of the cards, but it also enables the tabulating machines to deliver reports more quickly since the tabulating machines can commence operations on the cards before the sorting machine has finished. Heretofore this was impossible and, if the number of cards to be placed in numerical order was very large, the obtaining of a report might be delayed for a number of hours because of the large amount of time required to complete the sorting operations.

An advantage of the multi-column selecting commutator described above is that it may also be used for multi-column selection to segregate cards having predetermined control numbers or alphabetic data from the remaining cards of a batch. To perform this operation, switch S2 is closed, the dial switch S4 is placed in the "off" position denoted in Fig. 9, switch S1 is placed in the position indicated by solid lines, and switch S3 closed. The principle on which the multi-column selection operation is based is the same as in Patent No. 1,933,357.

When the selection is to be effected with respect to numbers alone, the slides N are all placed in the position of Fig. 1, the brush holder 15 is positioned so that the brush SB1 senses the units column of the control number field and commutator C1 is made current conducting in all positions. One or more of the slides A are placed in the "off" position, beginning with the bottom one in Fig. 9, according to the number of columns in the control number field. If the control number field had only six columns, for example, the lowest four slides A (Fig. 9), or the left hand four in Fig. 2, would be placed in the "off" position, while the remaining slides A will be positioned according to the values of digits in the number to be selected. As an illustration, if the number "4871" were to be selected, the extreme right hand slide A (Fig. 2) would be set to the "1" position, the next adjacent one to the "7" position, the third one from the right to the "8" position, and the fourth one to the "4" position, respectively. This has the effect not only of rendering the right four sections (Fig. 2), or the top four in Fig. 9, of the selecting commutator effective by establishing a current connection between the brushes SB1 to SB4 and the four contact strips 46 associated therewith, but also has the effect of disconnecting from strips 46 the segments 45 corresponding to the index-point positions which will be perforated in a card having the designated control number. With this setting of the slides A and the several switches, the sensing of a card having the predetermined control number will result in no circuits being established through the selecting commutator since, for all the positions of the commutator corresponding to the holes in the card, the segments 45 will be non-current conducting. Consequently such a card will become deposited in the reject pocket.

If a card designated -4872-, for example, were sensed, the "2" segment 45 associated with the brush SB1 will be current conducting with respect to the contact strip 46 to which said brush is connected whereby, at the "2" point in the cycle, a circuit will be established as follows: Line wire W1, switch S2, common brush CB, contact roller CR, brush SB1, the element 51 and the prong 46a associated therewith, common strip 46, the prong 46a associated with the "2" segment 45, said segment, a brush 36, common strip 42, switch S1, relay R3, brushes 33 and segment of commutator C4, and switch S3, to line wire W2. Relay R3 establishes a holding circuit for itself through brushes 31 and segment of commutator C2. At the "12" point in the cycle, the circuit through commutator C4 is broken thereby permitting the sorting magnet SM to be energized at the "12" position. This causes the card designated -4872- to become deposited in the "12" pocket.

When alphabetic multi-column selection is desired, the slides N are positioned according to the numerical values of the holes in the index point positions 1 to 9 of the columns of the alphabetic field, while the slides A are positioned in accordance with the holes in the "0," "11," and "12" positions of the alphabetic columns. A card perforated in accordance with a two hole alphabetic code is illustrated in Fig. 3 of Patent No. 2,079,422. This code is in common use in the art and consists in representing each of the letters of the alphabet by a combination of a hole in the "0," "11," or "12" index-point positions with a hole in one of the "1" to "9" positions. For instance, the letter "A" is designated by a hole in the "12" position in combination with a hole in the "1" position. It will be noted in Fig. 2 that the scales on the members 44 have not only numerals but also adjacent each numeral is a group of letters. For instance, opposite the numeral "9" is the group "IRZ" signifying that these letters are all designated by the combination of a "9" hole and some other hole. The order of the letters in each group from top to bottom in Fig. 2 corresponds to the order "12," "11," and "0" to facilitate setting the commutator according to the combinations of holes designating the letters. For instance, the letter "I" is designated by the combination of a "12" hole and a "9" hole; the letter "R" by an "11" hole and a "9" hole; while the letter Z is designated by the combination of a "0" hole and a "9" hole. Thus, in order to partly set the commutator for a given letter one of the slides N is moved to bring its index portion 49 opposite the numeral corresponding to the group in which the letter is found. For instance, if it were desired to set the commutator to correspond with the letter "R" in a given column, the slide N for that column would be moved to bring its index mark 49 opposite the numeral 9. When one of the slides N is set in such fashion, the corresponding slide A will be moved to bring it opposite one of the numerals "12," "11," and "0" at the other end of the scale, according to whether the desired letter is at the top, the middle, or at the bottom of the group in which it is included. Thus, in the illustrative case, the finger piece A must be moved to the "11" position to complete the setting of the commutator to correspond with the combination designating the letter "R." The following table illustrates how the slides A and N must be set combinationally to condition the commutator for selecting in accordance with the various letters of the alphabet.

| Slide A | | | Slide N |
|---|---|---|---|
| 12 | 11 | 0 | |
| A | J | | 1 |
| B | K | S | 2 |
| C | L | T | 3 |
| D | M | U | 4 |
| E | N | V | 5 |
| F | O | W | 6 |
| G | P | X | 7 |
| H | Q | Y | 8 |
| I | R | Z | 9 |

In the first three columns are shown the letters of the alphabet under the numerical positions to which the slide A must be set for any given letter, while in the fourth column is shown the position to which the corresponding slide N must be set for the same letter. Thus, the letter A is set by moving slide A to the "12" position and slide N to the "1" position, the letter J by moving slide A to the "11" position and slide N to the "1" position. It will be appreciated that by positioning the slides A and N properly in the several sections of the selecting commutator, any alphabetic data, such as names, may be introduced into the machine and the effect of setting the slides is to render the selecting commutator non-current conducting for every index-point position having a hole in a card perforated with the same data as has been introduced into the machine.

The operation is the same for alphabetic multi-column selection as for numerical multi-column selection. Any card having all of its holes conforming to the alphabetic code combinations, in accordance with which the selecting commutator is set, will be deposited in the reject pocket because for every hole in the card the corresponding position in the multi-column selector commutator will be non-current conducting. However, if one or more columns has a different letter designated therein, it will be evidenced by one or two holes in positions other than those for which the commutator has been set and will result in the circuit being established as described above for numerical selection through the sorting magnet SM at the "12" point in the cycle.

Insofar as the operation of the alphabetic and numerical multi-column selection is concerned, the selecting commutator described herein has several advantages over the one disclosed in Patent No. 1,933,357. In the first place, the construction of the rotary part of the commutator is considerably simpler and lighter whereby there will be less wear and less load is imposed upon the driving motor. In the second place, since the setting of the commutator is effected by means of slides which are common to all the positions associated with a given column, there is less chance of error since each slide can be set to only one position. A third advantage is greater accessibility of the switches. In the commutator described in Patent No. 1,933,357, the machine must be turned by hand in order to render the switches for the index point positions accessible for setting and it is very easy for the operator to forget to restore some of them to current-conducting position when resetting the commutator in accordance with a different number with the result that errors often occur. Such errors are costly owing to the length of time it takes to resort the cards to correct the error. A fourth advantage of the selecting commutator is that the necessity for separate column switches like the switches 89 of Patent No. 1,933,357 is eliminated thereby reducing and simplifying the wiring of the machine. In the commutator described herein, the column switches are built into the commutator at little additional cost and do not require any additional wiring. Machining operations have been greatly reduced and assembling simplified. By the use of simple moldings greater use of stamped parts, and less use of turned and machined parts, the cost of manufacturing the selecting commutator has been greatly reduced.

While there has been shown and described and pointed out the fundamental novel features of the invention as applied to a single embodiment it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A selecting commutator for machines of the class described including an arcuate support member composed of insulating material, a series of commutator segments molded in said arcuate support member; a contact strip secured to the side of the support member and having a plurality of prongs or fingers formed integral therewith, each prong cooperating with one of said segments; and a slide mounted on said arcuate member and operative when moved along said member to successively engage and disengage the prongs from the segments.

2. In a selecting commutator for a machine of the class described, a rotary brush, an arcuate support member disposed concentric with the axis of rotation of said brush, a series of commutator segments mounted on said member and disposed in an arc so as to be successively engaged by said brush, a contact strip mounted on said arcuate member and having a series of prongs or fingers each corresponding with one of said segments, and means slidably mounted on the arcuate member for controlling the engagement of said prongs with the segments.

3. A selecting commutator for record controlled machines comprising a series of rotary brushes each associated with one column of a record field, a series of arcuate support members each corresponding to one of said brushes and disposed substantially in the plane thereof, a series of commutator segments mounted on said arcuate member so as to be successively engaged by said brushes; a contact strip for each of said support members having a series of contact prongs or fingers corresponding in number with said segments, said prongs being engageable with a part of its associated segment; and means supported and guided by the support members for controlling the movements of said prongs toward and away from their associated segments.

4. In a machine of the class described, means to successively sense a plurality of columns of a record, sorting mechanism operative to normally sort records according to designations in a predetermined one of said plurality columns, a multi-column selecting device operatively connected to the sensing means, and means controlled by the multi-column selecting device for preventing the sorting in the normal way of records containing only zero designations in the columns sensed by the sensing means.

5. In a sorting machine, a plurality of sensing brushes each operative to sense one column of a control number field, sorting mechanism, means controlled by a predetermined one of said brushes for normally causing the sorting mechanism to distribute the records in accordance with data designations in a predetermined column, a multi-column selecting commutator, and means controlled by the multi-column selecting commutator for preventing the sorting in the normal way of all records which contain only zero designations in the columns sensed by all of said brushes.

6. In a machine of the class described, the combination of record sensing means operative to sense a plurality of columns comprising a control number field, means controlled by the sensing means and responsive to designations in a predetermined column of those sensed for segregating the records in groups according to the value of the designations in said column, a multi-column selector device, and means controlled by said selector device for causing records which have only zero designations in the remaining columns sensed to be rejected.

7. In a machine of the class described, a plurality of sensing elements, a multi-column selector device having a plurality of sections each associated with one of said sensing elements and settable according to the numerical values of designations in the column sensed by the corresponding sensing element, sorting mechanism normally controlled by a predetermined sensing element to distribute records in accordance with the values of designations in said column, and means controlled by said selecting device when its individual sections have been set to correspond with zero designations for segregating records which have only zero designations in all columns from the records which have one or more numerical designations in one or more of the columns sensed.

8. In a machine of the class described, the combination of record sensing means operative to sense a plurality of columns, a multi-column selecting device settable to select records which contain only zero designations in the columns sensed, sorting mechanism operative to sort the records according to numerical data designations in a predetermined column of said plurality, and means controlled by the multi-column selector device for controlling the sorting mechanism to sort the records which have only zero designations in all the columns sensed differently from the records which have one or more numerical values in one or more of the columns sensed.

9. A multi-column selector device for record controlled machines comprising a plurality of arcuate support members each associated with one column of a control number field, a plurality of groups of commutator segments each mounted in one of said support members and corresponding in number to the index-point positions of the columns of a control number field in a record, a series of contact strips each mounted on one of said arcuate members and having a plurality of projections each engageable with one of the segments; a series of slides each associated with one of said support members and guided thereby, each slide when selectively moved along said support member successively engaging said projections so as to cause them to make and break contact with corresponding segments, and a series of rotary brushes each operative to successively wipe over one series of segments.

10. A commutator segment for multi-column selecting device comprising a support member, a row of segments supported by said member, said segments corresponding in number to the index point positions of a column in a record card, a common contact strip associated with said row of segments and having a plurality of fingers or prongs greater in number by one than the number of said segments, all but one of said fingers being associated with one of such segments, a contact element associated with the remaining finger; a member slidably mounted on said support member and guided thereby and operative when selectively moved along said member to control the contact of said fingers with said segment, said slidable member when moved to an extreme position causing the remaining finger to break contact with the contact member; and a rotary brush operative to traverse said segments in said section.

11. In a machine of the class described, the combination of record sensing means operative to sense a plurality of columns of a control number field, a multi-column selector device having a plurality of sections each corresponding to one of said columns and having a series of finger pieces whereby said commutator may be selectively set so as to be responsive to only predetermined designations in each column, sorting mechanism controlled by the sensing means, selecting means to render the sorting mechanism effective with respect to a predetermined column whereby to sort records according to designations in said column, and means controlled by said selector device when set to zero positions for causing records which have only zeros in said columns to be segregated from the remaining records.

12. In a machine of the class described, means for sensing a part of a record field comprising a plurality of columns in which field multi-digit numbers, such as serial numbers, are recorded by means of designations differentially disposed in the columns of said field, means cooperating with the sensing means for differentiating between records having numerical values recorded in a predetermined number of said columns and records which do not have numerical values recorded in said predetermined number of columns, means to sense a preselected column of the remainder of said field, sorting mechanism, means to place the sorting mechanism under control of said second sensing means whereby to condition the machine to sort the records according to the values of the designations in said preselected column of the remainder of the field, means controlled by the differentiating means for controlling the sorting mechanism to cause the records having no numerical values recorded in the predetermined number of columns and the preselected column to be deposited in a pocket separate from the pockets receiving the records deposited according to values of designations in the preselected column of the field whereby records having numbers recorded therein of a predetermined number of significant digits are deposited in one pocket and the remaining records distributed to other pockets according to the values of the designations in the preselected column of the field.

13. In a machine for sorting records in which control numbers, such as serial numbers, are recorded by means of designations differentially disposed in the columns of a control number field comprising a plurality of columns, each column corresponding to a denominational order of the control number; sorting mechanism including a series of record receiving receptacles and means to distribute the records to said receptacles according to the values of designations; a multi-column sensing device for said field, means to render the sorting mechanism normally operative for control by the sensing device in accordance with the designations in a predetermined denominational order column, a multi-column selector device controlled by the sensing device and settable to select records in accordance with predetermined designations in the columns corresponding to the denominational orders above the predetermined column, and means controlled by said selector device for controlling the effect of the designations in the predetermined denominational order upon the sorting mechanism, said means causing records which have designations other than the predetermined designations in the higher denominational order columns to be distributed to certain of said pockets according to the values of the designations in the predetermined denominational order, and operative to cause those records which contain the predetermined designations in both the predetermined and higher order columns to become deposited in a common pocket separate from the pockets receiving the records which lack the predetermined designations.

14. In a machine for sorting records identified by multi-digit numbers in which the various denominations are recorded by designations disposed in the columns of a field assigned to a control number, sorting mechanism including a series of sorting pockets, certain of which pockets correspond to the values of the index point positions of a column, another of which pockets does not correspond to any index point position but comprises a reject pocket, means to render the sorting mechanism responsive to the designations in a predetermined denominational order column, a multi-column selector device settable to differentiate between records having digits in the higher denominational order columns and records which do not have any digits in the higher denominational order columns, and means controlled by the selector device for causing the sorting mechanism to sort the records into the numerical pockets according to the values of the designations in the predetermined denominational order, and operative to cause the records having no digits in the higher denominational order columns and no designation in the predetermined column other than a zero designation to be deposited in the reject pocket.

15. In a sorting machine, sorting mechanism including a series of sorting pockets certain of which correspond to a series of numerical values and one of which does not correspond to any numerical value, a record analyzing device for sensing data designations disposed in the columns of a record field comprising a plurality of columns, means to place the sorting mechanism under control of the part of the analyzing device sensing a predetermined column whereby the sorting mechanism normally tends to distribute the records to the pockets according to the designations in the predetermined column, means controlled by a different part of the analyzing device and responsive to predetermined designations in the columns of the field adjacent the predetermined column, and means controlled by the last named means for controlling the sorting mechanism to cause the records having the predetermined designations in adjacent columns and no numerical designation in the predetermined column to be distributed to the pocket which does not correspond to a numerical value.

16. In a machine controlled by records having record fields comprising a plurality of columns certain of which columns contain designations which represent significant characters, the number of significant characters recorded in the field varying; means to sense all of the columns, sorting mechanism, means to place the sorting mechanism under control of the part of the sensing means sensing a selected column whereby to variably sort the records according to the different designations in the selected column, a selector device presettable to distinguish between records having a certain number of significant characters recorded in said field and records having a greater number of significant characters, and means controlled by the selector device for controlling the operation of the sorting mechanism while said mechanism is under control of the sensing means in such fashion as to permit only those records having the greater number of significant characters to be variably sorted according to the designations in the selected column and to cause the sorting mechanism to segregate records having the certain number of significant characters from the records having the greater number of significant characters.

17. In a machine of the class described, a record sensing device, sorting mechanism including a series of record receiving pockets, means to place the sorting mechanism under control of a part of the sensing device to render the machine normally operative to sort records to the pockets in accordance with data designations in a predetermined column of a field comprising a plurality of columns in which columns multi-digit numbers are recorded by data designations differentially disposed in said columns, a selector device controlled by the remainder of the record sensing device and settable to correspond with predetermined designations in the records, and means controlled by the selector device for causing the records which have designations other than the predetermined designations in columns of said field to be distributed differently from the records having the predetermined designations whereby the records not having the predetermined designations are sorted to certain of said pockets according to the values of designations in the predetermined column and the records having the predetermined designations are deposited in a common pocket separate from the pockets for the records not having the predetermined designations.

18. In a record controlled machine; means for sensing data designations in a record field comprising a plurality of columns, each of which columns contains a series of index point positions, in one or more of said positions designations may appear to represent a character such as a letter or number, said designations being disposed in said columns according to a prearranged code whereby the number and relative positions of the designations in a column determine the character designated; an element for controlling the operation of the machine; a multi-column selector comprising a plurality of sections, each section corresponding to a column of the record field and including a plurality of slides, said slides corresponding in number to the possible number of code designations appearing in any column and each slidable to any one of a plurality of positions corresponding to index point positions in said column whereby, by setting the slides for each section in agreement with the code designations in the corresponding column of a record to be selected, the multi-column selector may be set in agreement with the coded data in said record field; and means conjointly controlled by all of the slides for controlling the operation of the machine controlling element.

19. In a record controlled machine; means for sensing data designations in a record field comprising a plurality of columns, each of which columns contains a series of index point positions, in one or more of said positions designations may appear to represent a character such as a letter or number, said designations being disposed in said columns according to a prearranged code whereby the number and position of the designations in any column determine the character designated in such column; an element for controlling the operation of the machine; a multi-column selector comprising a plurality of sections, each section corresponding to a column of the record field and including a plurality of slides, said slides corresponding in number to the possible number of designations appearing in any column and each slidable to any one of a plurality of positions corresponding to index point positions in said columns whereby, by setting the slides for each section in agreement with the designations in the corresponding column of a record to be selected, the multi-column selector may be set in agreement with the data in said record, at least one of said slides in each section being movable to a position which does not correspond to any index point position; means controlled by the slide set to the last-named position for rendering inoperative the entire section to which said slide belongs; and means conjointly controlled by all of the slides for controlling the operation of the machine controlling element.

20. In a machine of the class described, means for sensing the columns of a control number field in which column control numbers are represented by control number designations, said control numbers varying in respect to the number of digits comprising said control numbers; sorting mechanism, means to control the sorting mechanism to sort records according to the values of the designations representing a single digit in any predetermined column; a multi-column selector including means to preset said selector to differentiate between records having a predetermined number of digits recorded in a predetermined number of columns and records having a greater number of digits recorded in a greater number of columns, the number of digits being indicated on the records by the number of columns having the designations for significant digits, means to connect the control means for the sorting mechanism to the sensing means to render the sorting mechanism operative to sort the records according to the values of the digits in a selected column, and means to prevent sorting of the records according to the digits in the selected column unless the records contain more than the predetermined number of digits.

21. In a machine controlled by records identified by control numbers comprising several digits, each digit being represented by a designation differentially disposed in the index-point positions of one of the columns of a control number field comprising several columns in each record; a plurality of record sensing elements, each for sensing the designations in one of said columns of the record field; sorting mechanism, including a series of record receiving pockets; means to place the sorting mechanism normally under control of the sensing element for a predetermined column to normally cause records to be sorted according to designations in the predetermined column, a multi-column selector device controlled by the remaining sensing elements and settable to be responsive to certain designations in the remainder of the field, and means controlled by the selector device for causing those records having said certain designations in the remainder of the field to be distributed to certain of said pockets according to the numerical values of the designations in the predetermined column and operative to cause all of the records not having said certain designations in any column in said field to be distributed to a common pocket separate from the pockets receiving the records having said certain designations in any column in said field.

RALPH E. PAGE.